Sept. 21, 1926.
J. GRIGAS
THERMAL CIRCUIT CONTROLLER
Filed July 8, 1925  2 Sheets-Sheet 1
1,600,760
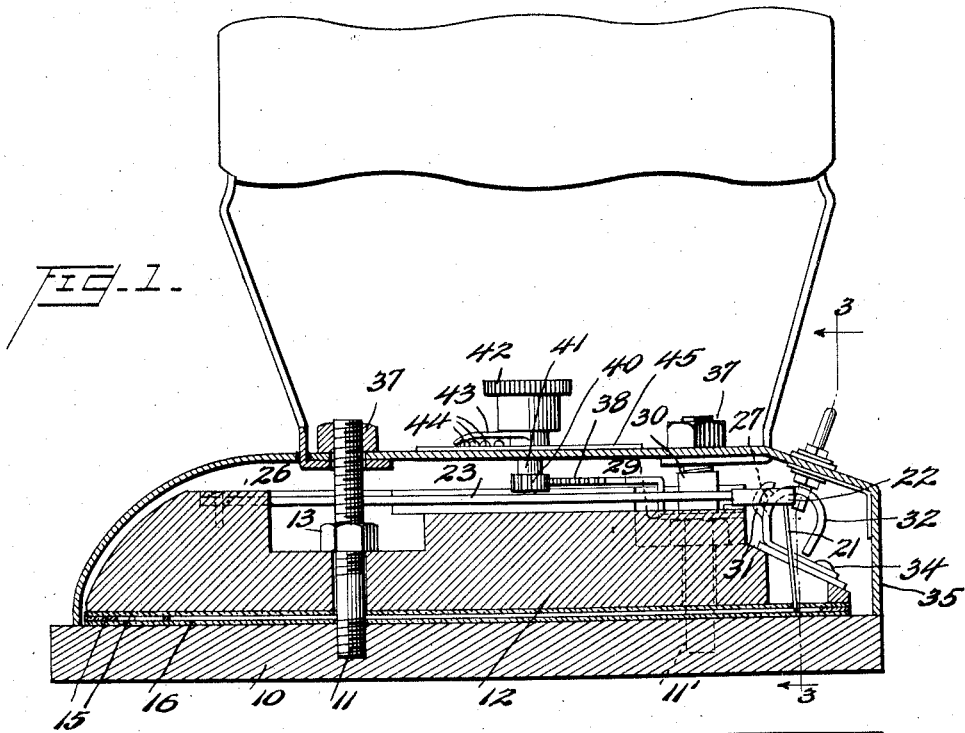
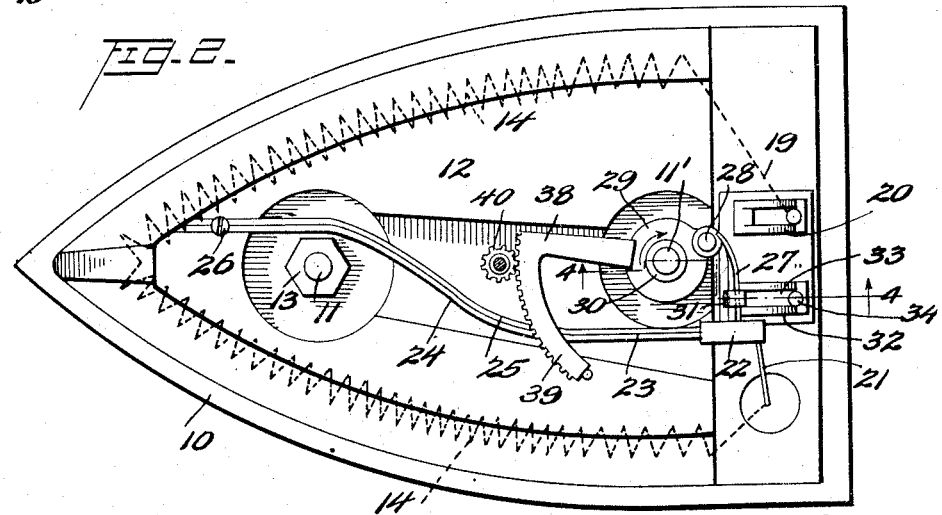
Inventor
Joseph Grigas
By Cushman Bryant & Darby
Attorneys

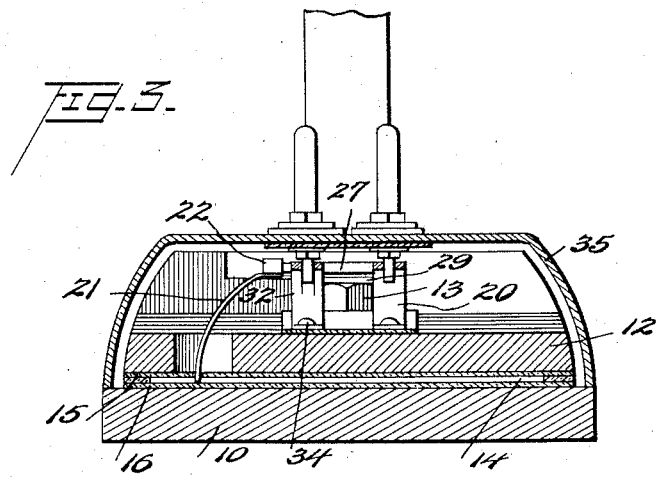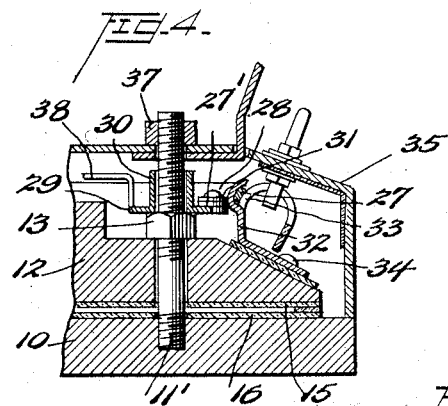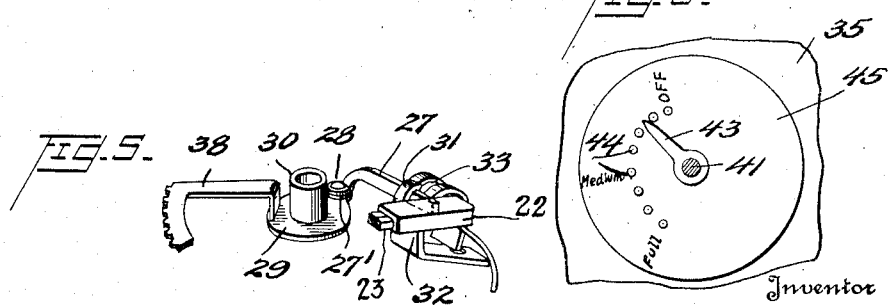

Patented Sept. 21, 1926.

1,600,760

UNITED STATES PATENT OFFICE.

JOSEPH GRIGAS, OF SHENANDOAH, PENNSYLVANIA.

THERMAL CIRCUIT CONTROLLER.

Application filed July 8, 1925. Serial No. 42,255.

The present invention relates to means for automatically controlling the temperature of electrically heated apparatus, such as sad irons, and the like, and comprises means whereby the current may be automatically shut off when the heat rises above a predetermined temperature, and automatically turned on when the temperature falls below such temperature.

Although such devices are broadly old, they depend ordinarily, for regulation, upon means for varying the distance which one of the contact members must be moved, and this is effected either by directly varying the extent of movement of a thermostatic member, or by varying the effect of the movement through a leverage system or equivalent mechanical arrangement.

The present invention marks a departure from this type of control, and has, as its object, the provision of regulating means in which the extent of movement of the thermostatic element to interrupt the circuit will remain constant, while means is provided for regulating the action of the thermostatic element under temperature variations. The invention comprises two complementary contacts, one of which is movable by the thermostatic element, and associating with the thermostatic element means which will be effective to regulate the responsiveness of the element to temperature variations. This is effected, preferably, by creating a yielding opposition to the movement of the thermostatic element under temperature increase, and more, particularly, by tensioning the thermostatic element itself, which is in the form of a spring bar adapted to be readily tensioned.

In the preferred construction, the contact, which is movable by thermostatic element, is carried by said element, and in order to maintain the distance between said contacts constant, the complementary contact is movable with the thermostatically operable contact as the position of the latter is changed when the thermostatic element is tensioned. Another feature of the invention consists in employing the second contact, or the one which is not moved by the thermostatic element to tension the thermostatic element.

The above and other objects and features of the invention will become clearer as the description proceeds in connection with the accompanying drawings, wherein there is shown, for purposes of explanation, one embodiment of the invention.

In the drawings:—

Figure 1 is a vertical section of a sadiron with the invention embodied therein.

Figure 2 is a top plan view with the cover and handle removed.

Figure 3 is a vertical section on the line 3—3 of Figure 1.

Figure 4 is a detail sectional view showing more clearly the construction of the arrangement of the contact which is movable to tension the thermostatic element.

Figure 5 is a perspective showing the movable contact and coacting parts separated from the remainder of the device, and Figure 6 is a large detail view showing the dial and adjusting mechanism.

Referring to the drawings for a more detailed description, 10 indicates the base of an electric iron carrying studs 11, 11' projecting upwardly through a weighting element or plate 12, which is secured to the base by means of nuts 13 upon the studs. The studs 11 serve to clamp between the plate 12 and the base, the heating element which may be of any usual form, such as a flat coil 14 disposed between mica strips 15, 16 by which it is insulated from the base and plate 12.

One end 19 of the resistance coil is connected to a stationary terminal 20 and the other end is connected, by means of an upwardly bowed extension 21, with a contact 22 carried by a thermostatic element 23, which, in the present instance, is in the form of a bar formed of different materials or metals 24, 25, having different coefficients of expansion. At one end, the bar is clamped upon the plate 12 by means of a screw 26, and the other end carries the contact 22 which is suitably insulated from the bar or thermostatic element.

The thermostatic element is preferably formed of spring metals, and is arranged so that the contact 22 may cooperate with a complementary contact 27 which is a relatively short metallic strip mounted on a pin 28 upon the flange 29 of a collar 30, rotatably mounted upon the stud 11'. The contact strip 27 is insulated from the collar by means of a mica ring 27', and extends through an eye formed by a clip 31 upon a terminal 32 corresponding to the terminal 20, each of the terminals being provided with a slot 33 between which fit studs 34 carried by a cover 35, the studs serving to receive the terminal plug of a lead-in or connecting wire for the iron. The cover may be secured in position by means of the studs 11, 11' which project through openings therein and carry nuts 37 to secure the cover in position.

The contact 27 is movably mounted by means of the collar 30 so that it may serve as the means for deflecting or bending laterally the end of the element 23, and thereby tension the same. Adjustment of the contact 27 to carry it into engagement with the contact 22 and to tension the thermostatic bar may be effected by means of an arm 38 extending from the flange 29 of the collar 30 and carrying an arcuate rack 39 which meshes with a pinion 40 upon a pin 41 extending through the cover, and operable by means of a hand wheel 42. The pin 41 carries a pointer 43, which engages beads or knobs 44 upon a graduated dial 45, suitably marked to indicate the temperature at which the thermostatic element will move to interrupt the circuit. The knobs 44 engage the indicator finger 43 and will prevent movement of the collar 30, and its contact 27 under the opposing tension of the thermostatic element 23, except when the pin 41 is moved manually to vary the tension of the thermostatic element or to interrupt the circuit.

It will be understood that the course of the current is through the terminal 20, coil 14, contacts 22 and 27 and terminals 32; terminals 20 and 32 serve to receive pins 34 carried by the cover for engagement by the terminal plug of a connecting wire.

In the operation of the iron, or other device to which the controller is applied, the hand wheel 42 will first be adjusted to engage the contacts 22, 27, thereby completing the circuit, and also to tension the thermostatic element 23 to the desired extent, which will depend upon the temperature to which it is desired to heat the iron, it being understood that the more the contact 27 is moved to flex the thermostatic element, the greater will be the tension of the latter, and, consequently, the higher will be the temperature required to cause the thermostatic element to carry the contact 22 away from the contact 27 and interrupt the circuit. The graduations upon the dial adjacent the hand wheel will indicate to the operator the temperature selected for operation of the thermostatic element to effect breaking of the circuit, and the beads or knobs 44 in the dial will retain the hand wheel and pointer 43 in any selected position in opposition to the tension of the thermostatic bar. Whenever the temperature of the iron is raised beyond the predetermined degree selected, the thermostatic bar will separate the contacts 22 and 27 and maintain them separated until the temperature falls below the selected degree when the thermostat will automatically carry the contact 22 back into engagement with the contact 27.

Obviously, numerous modifications may be made in the structure illustrated and described without departing from the invention, which is set forth in the foregoing specification and in the drawings in detail simply for purposes of explanation, and in no sense to define the invention, the same being defined by the following claims.

I claim:

1. In combination with a heating element, thermostatic means for controlling the heat of said element comprising a thermostatic strip fixedly anchored and having a free end remote from said anchorage, a contact element carried by said strip adjacent said free end, a complementary contact adjustably mounted for movement relative to said first mentioned contact and its thermostatic strip, and manually operable means remote from said contacts to adjust said complementary contact, said means being adapted through adjustment of said contact to flex said thermostatic strip and vary its tension.

2. In combination with a heating element, thermostatic means for controlling the heat of said element comprising a thermostatic strip fixedly anchored and having a free end remote from said anchorage, a contact element carried by said strip adjacent said free end, a complementary contact adjustably mounted for movement relative to said first mentioned contact and its thermostatic strip, and manually operable means remote from said contacts to adjust said complementary contact, said means being adapted through adjustment of said contact to flex said thermostatic strip and vary its tension, and being also adapted to move apart and together said contacts, and thereby manually to make and break a circuit.

3. In combination with a heating element, thermostatic means for controlling the heat of said element comprising a thermostatic strip fixedly anchored and having a free end remote from said anchorage, a contact element carried by said strip adjacent said free end, a complementary contact adjustably mounted for movement relative to said first mentioned contact and its thermostatic strip, and manually operable means remote from said contacts to adjust said complementary contact, said means being adapted through adjustment of said contact to flex said thermostatic strip and vary its tension and comprising a rotatable shaft, means for supporting said complementary contact for movement, a pivotally movable arm connected to said complementary contact, and rack and pinion means for moving said arm from the shaft.

4. In combination with a heating element, thermostatic means for controlling the heat of said element comprising a thermostatic strip fixedly anchored and having a free end remote from said anchorage, a contact element carried by said strip adjacent said free end, a complementary contact adjustably mounted for movement relative to said first mentioned contact and its thermostatic strip, and manually operable means remote from said contacts to adjust said complementary contact, said means being adapted through adjustment of said contact to flex said thermostatic strip and vary its tension and comprising a rotatable shaft, means for supporting said complementary contact for free sliding movement, a pivotally movable arm connected to said complementary contact, and rack and pinion means for moving said arm from the shaft.

5. In combination with a heating element thermostatic means for controlling the heat of said element comprising a thermostatic strip fixedly anchored and having a free end remote from said anchorage, a contact element carried by said strip adjacent said free end, a complementary contact adjustably mounted for movement relative to said first mentioned contact and its thermostatic strip, and manually operable means remote from said contacts to adjust said complementary contact, said means being adapted through adjustment of said contact to flex said thermostatic strip and vary its tension, and comprising a stationary terminal having a guide eye, said complementary contact being freely slidable in said eye and making therein an electrical connection with said terminal, an arm connected with said contact but insulated therefrom, and rack and pinion means for moving said arm and thereby imparting a sliding movement to said complementary contact.

In testimony whereof I have hereunto set my hand.

JOSEPH GRIGAS.